United States Patent [19]
Mukasa et al.

[11] Patent Number: 6,078,174
[45] Date of Patent: Jun. 20, 2000

[54] APPARATUS FOR MEASURING EXCHANGE FORCE

[75] Inventors: Kōichi Mukasa; Kazunobu Hayakawa; Kazuhisa Sueoka; Kohji Nakamura, all of Sapporo; Yuichi Tazuke, Hitachi; Hideo Hasegawa, Koganei; Tamio Oguchi, Higashihiroshima, all of Japan

[73] Assignee: Hokkaido University, Sapporo, Japan

[21] Appl. No.: 09/059,399

[22] Filed: Apr. 14, 1998

[30] Foreign Application Priority Data

Apr. 15, 1997 [JP] Japan .................................. 9-097132

[51] Int. Cl.[7] ........................... G01R 33/02; G01N 24/00
[52] U.S. Cl. ........................ 324/244; 324/244.1; 324/300; 250/306
[58] Field of Search ................................ 324/244, 244.1, 324/260, 262, 318, 719, 758, 300; 250/306, 307, 310, 311, 423 F; 73/862.59; 365/151, 171

[56] References Cited

U.S. PATENT DOCUMENTS

| | | | |
|---|---|---|---|
| 5,623,205 | 4/1997 | Tomita et al. | 324/244 |
| 5,767,516 | 6/1998 | Kawanami et al. | 250/306 |

FOREIGN PATENT DOCUMENTS

| | | |
|---|---|---|
| 1-259210 | 10/1989 | Japan . |
| 8-075761 | 3/1996 | Japan . |
| 8-313545 | 11/1996 | Japan . |
| WO 96/32623 | 10/1996 | WIPO . |

OTHER PUBLICATIONS

Kōchi Takekasa et al., "Development of Spin Polarized STM Family," 29(3) Solid State Physics, Agune Technical Center 221–230 (1994).

K. Mukasa et al., "Spin–polarized STM and its family", Materials Science and Engineering B31, 1995, pp. 69–76.

K. Mukasa et al., "Exchange Interaction between Magnetic Moments of Ferromagnetic Sample and Tip: Possibility of Atomic–Resolution Images of Exchange Interactions using Exchange Force Microscopy", Jpn. J. Appl. Phys. vol. 33, 1994, pp. 2692–2695.

Kohji Nakamura et a., "First–principles calculation of the exchange interaction and te exchange force between magnetic Fe films", Physical Review B (Condensed Matter), vol. 56, No. 6, Aug. 1, 1997, pp. 3218–3221.

S.P. Jarvis et al., "A new force controlled atomic force microscope for use in ultra high vacuum", Review of Scientific Instruments, vol. 67, No. 6, Jun. 1996, pp. 2281–2285.

K.J. Bruland et al., "Optimal control of force microscope cantilevers, II. Magnetic coupling implementation", Journal of Applied Physics, vol. 80, No. 4, Aug. 15, 1996, pp. 1959–1964.

R. Wiesendanger et al., "Vacuum tunneling of spin–polarized electrons detected by scanning tunneling microscopy", Journal of Vacuum Science & Technology, vol. 9, No. 2, Mar.–Apr. 1991, pp. 519–524.

G.L. Miller et al., "Resonant phase shift technique for the measurement of small changes in ground capacitors", Review of Scientific Instruments, vol. 61, No. 4, Apr. 1990, pp. 1267–1272.

*Primary Examiner*—Jay Patidar
*Attorney, Agent, or Firm*—Venable

[57] ABSTRACT

In an apparatus for measuring an exchange force between a specimen and a probe, the specimen and probe are faced to each other with a distance within a close proximity or RKKY-type exchange interaction region from a distance at which conduction electron clouds begin to be overlapped with each other to a distance at which localized electron clouds are not substantially overlapped with each other. In order to prevent the probe from being attracted to the specimen by a force between the specimen and the force, a piezoelectric element is provided on a cantilever and a control signal supplied to the piezoelectric element is produced in accordance with a displacement of the cantilever to control a spring constant of the cantilever. The exchange force between the specimen and the probe is calculated from the control signal supplied to the piezoelectric element.

9 Claims, 10 Drawing Sheets

FIG_1

FIG_2

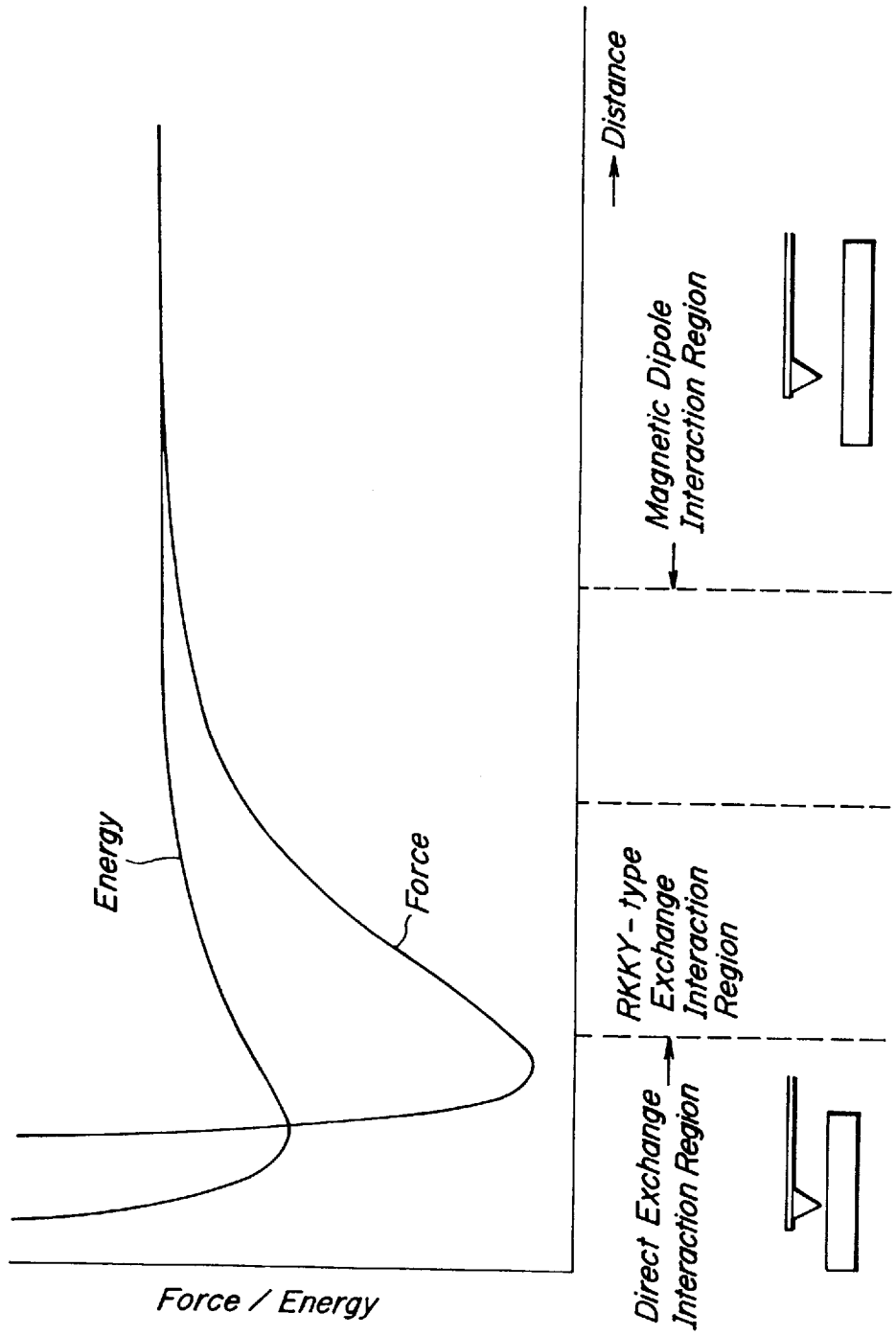
FIG._4

FIG_5
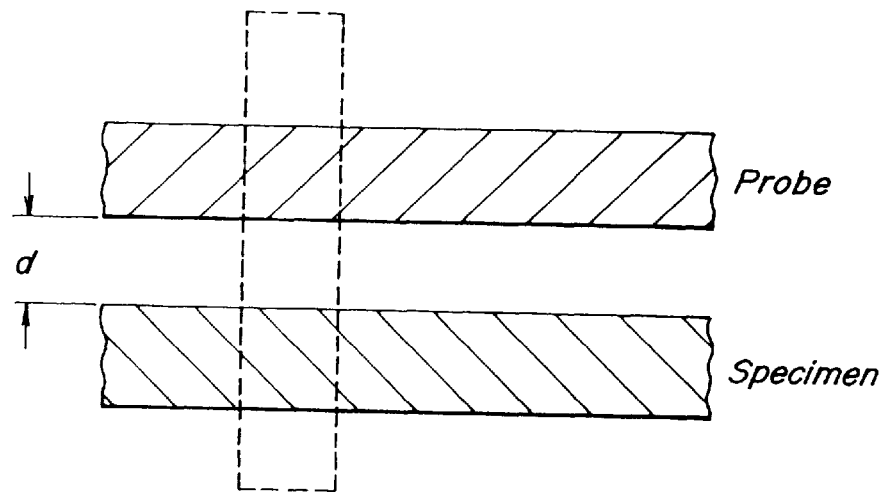
FIG_6
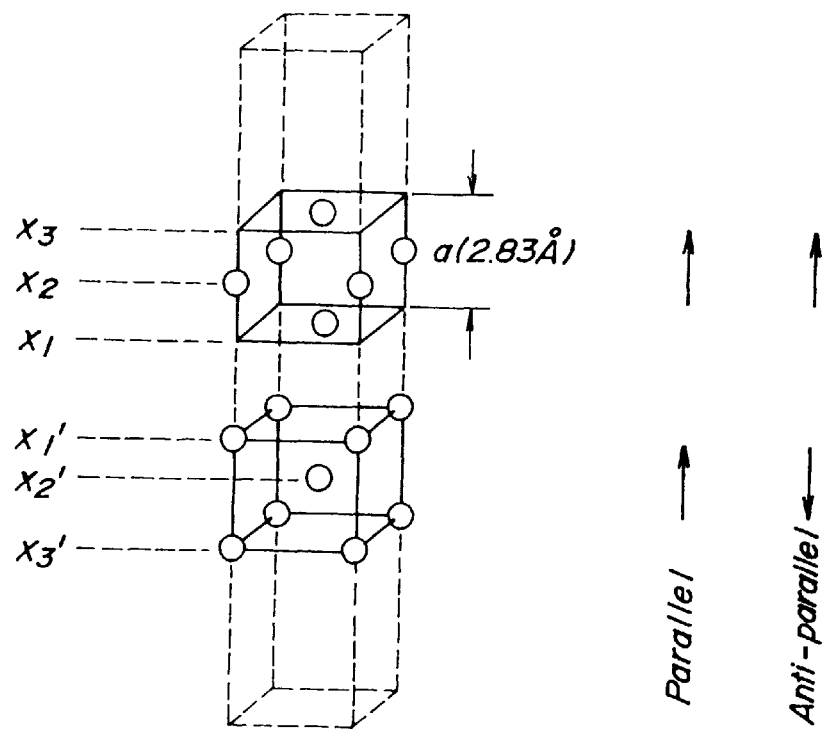

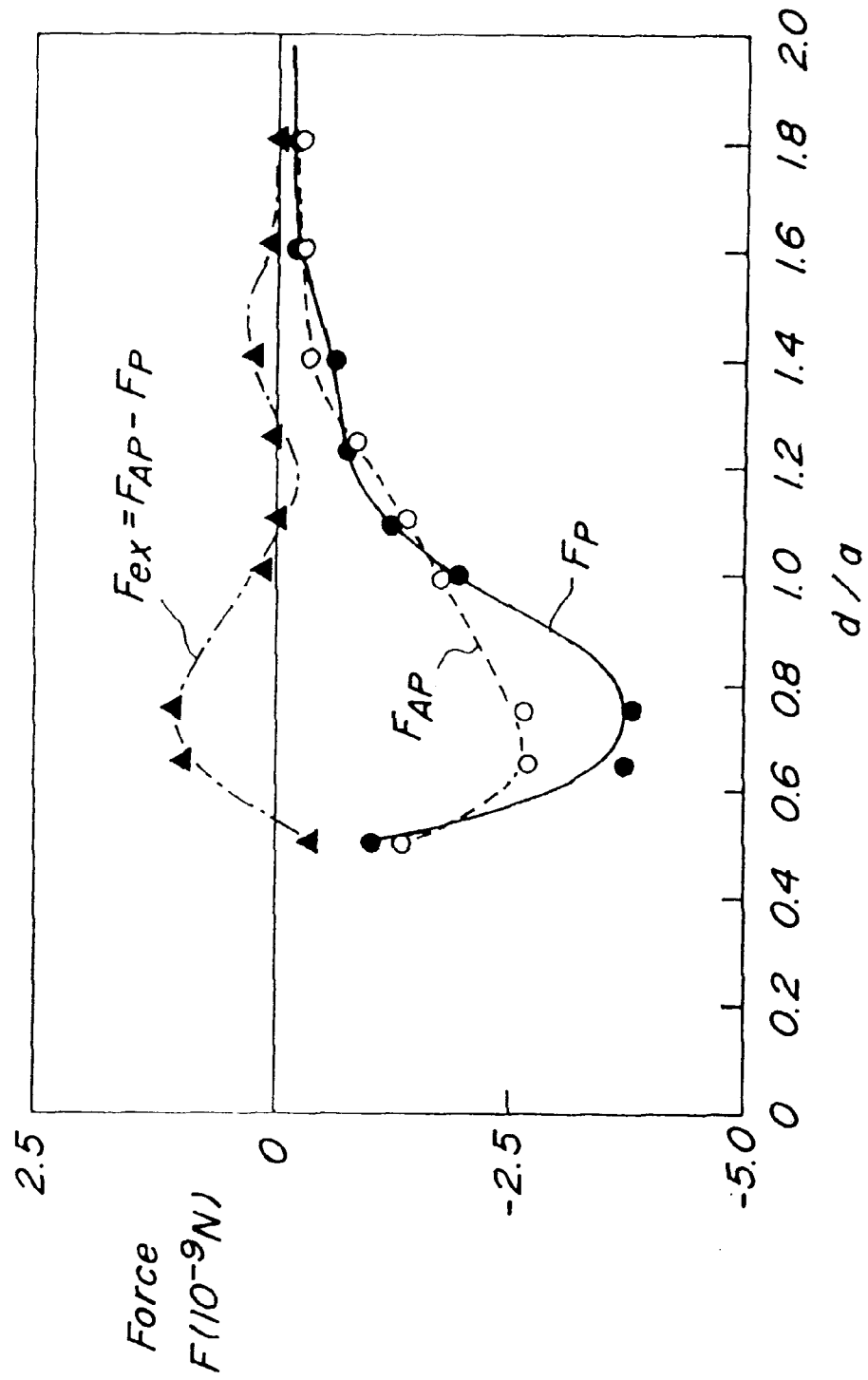

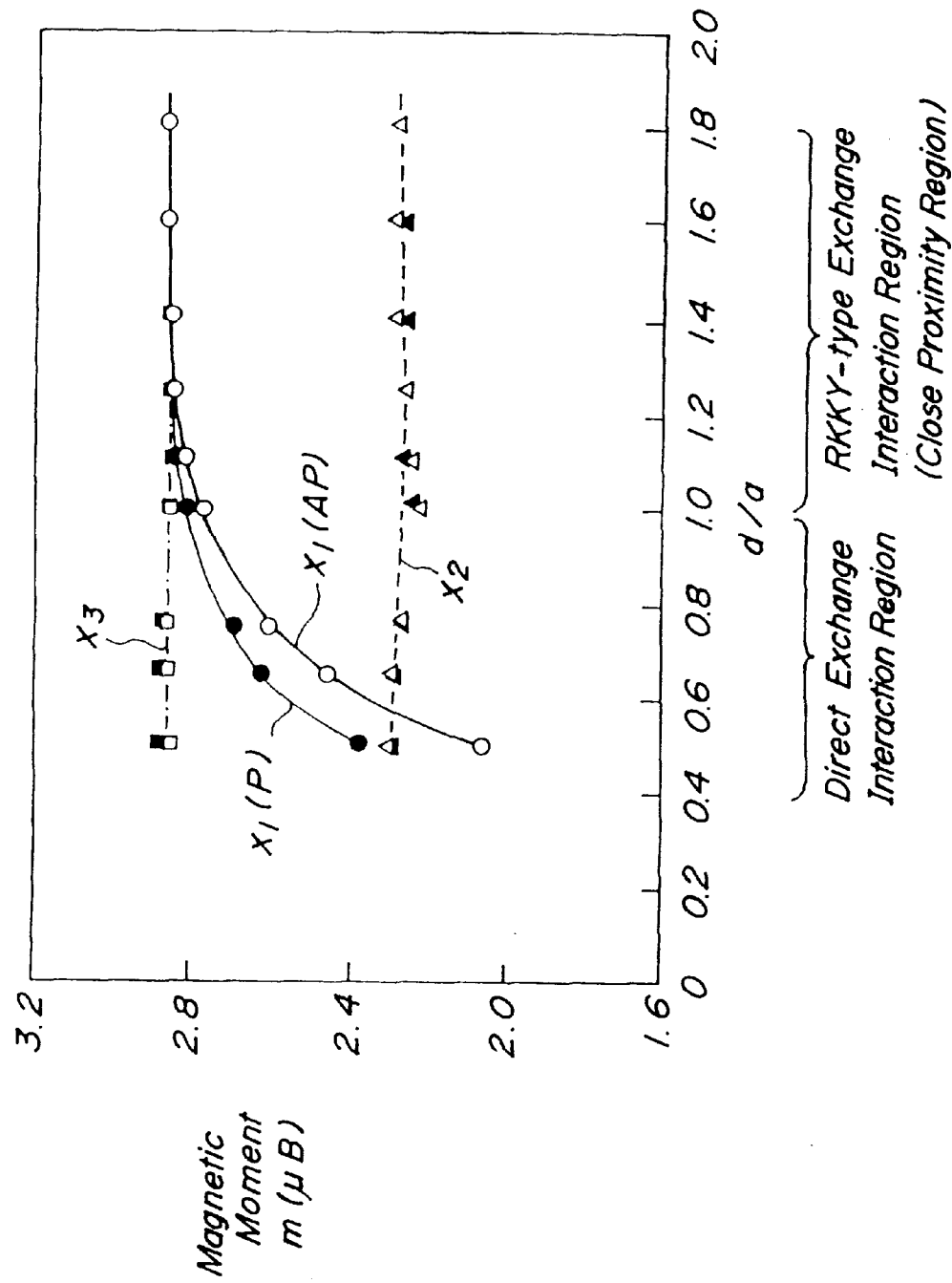

FIG_9A
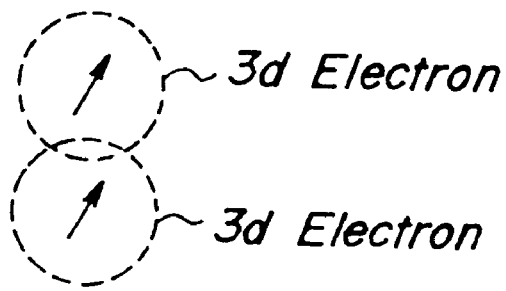
FIG_9B
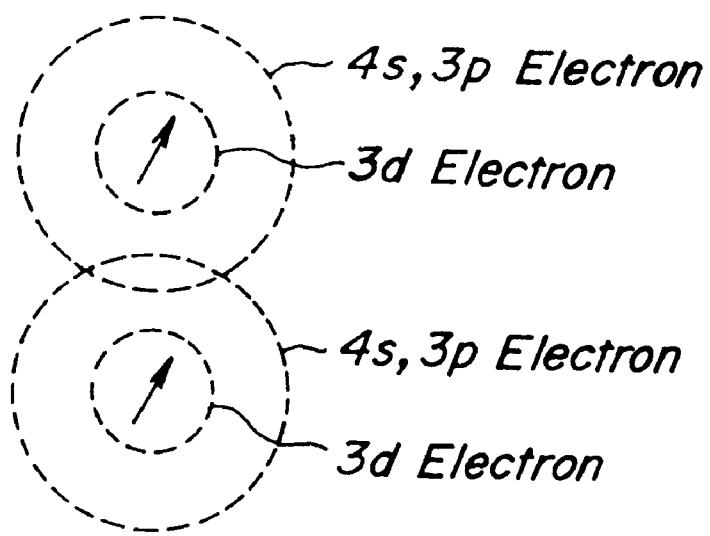

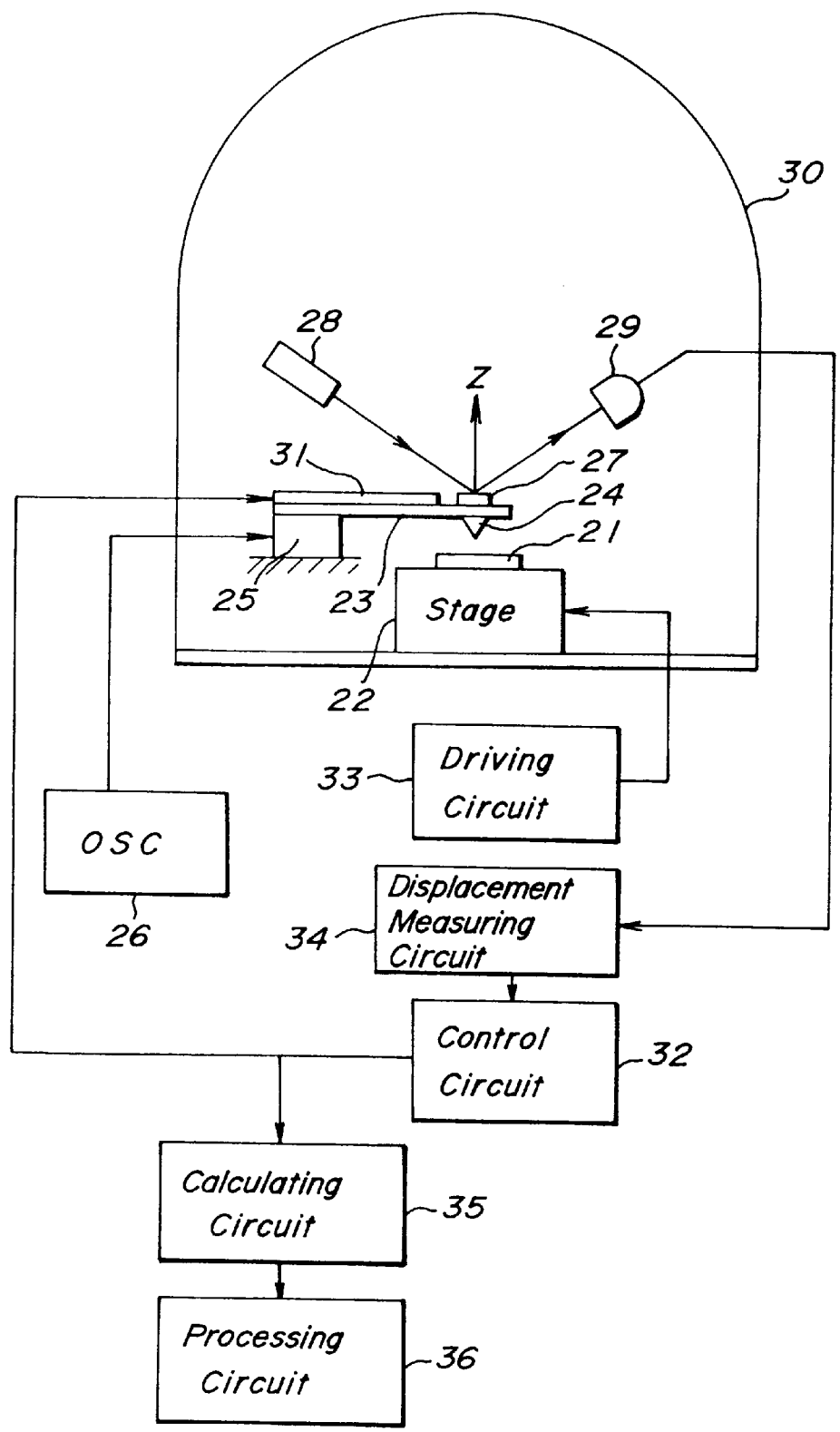
FIG_10

FIG_11
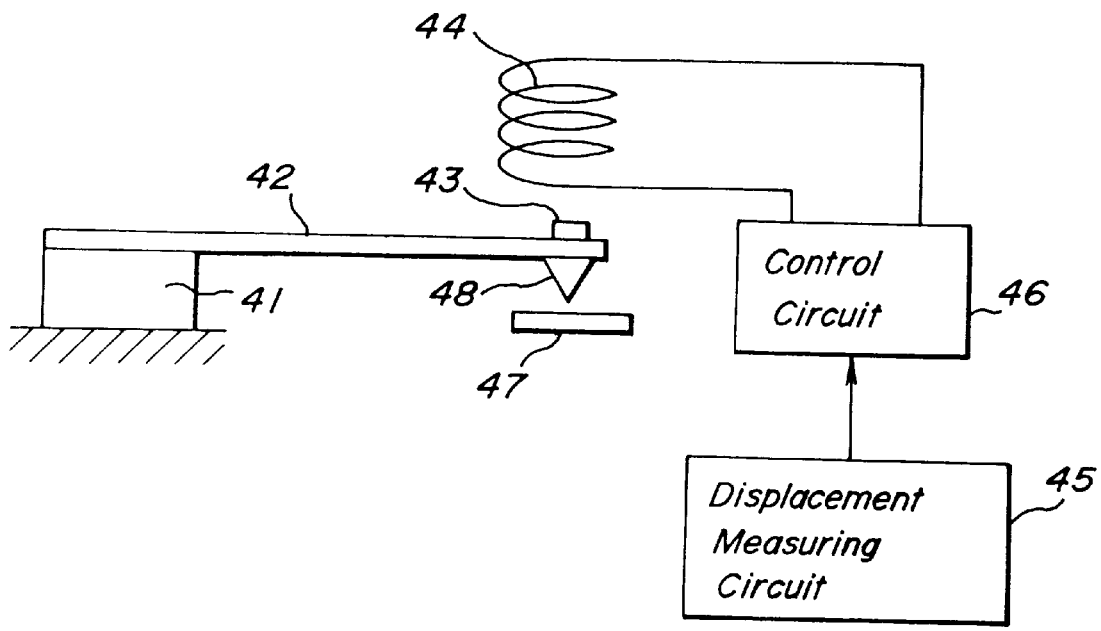
FIG_12
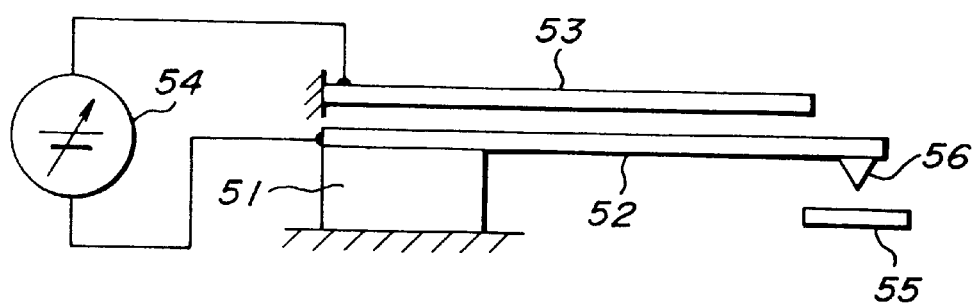

APPARATUS FOR MEASURING EXCHANGE FORCE

BACKGROUND OF THE INVENTION

1. Field of the Invention

The present invention relates to an apparatus for measuring an exchange force between a surface of a specimen and a probe which is faced to the specimen surface by a very small distance.

2. Description of the Related Art

Heretofore, in many known methods of analyzing solid specimens using an electron beam, the intensity (the number of electrons) and the kinetic energy are adopted as a measure for analysis. Another measure for the investigation is electron spin. There have been proposed several methods of evaluating a microscopic surface magnetism of a solid substance on the basis of the electron spin. For instance, there have been proposed several methods of determining directions of magnetic moments of respective atoms with atomic resolution as illustrated in FIG. 1.

In accordance with recent progress in electronics, a recording density on magnetic recording medium has become higher year after year. FIG. 2 is a chart representing a variation of the recording density in accordance with progress in the magnetic recording medium and various methods of evaluating the surface magnetism. The horizontal axis denotes a time in the Gregorian year, the left-hand vertical axis a linear recording density (cycle/cm), and the right-hand vertical axis represents a resolution of methods of evaluating the surface magnetism in μm and nm. Magnetic recording began in 1900 having a wavelength of 1 mm and have become more and more dense. The linear recording density has been improved in audio magnetic tape, β magnetic tape and VHS magnetic tape. In a recent evaporation tape, a length of one bit is 0.3–0.4 μm. In a modern hard disc, a length of one bit has shortened to 0.16–0.19 μm. By the electron holography, magnetic bits of 0.085 μm were observed on Co-Cr media. The resolution in evaluation methods of surface magnetism has been also improved. The resolution of the Bitter technique has been improved from 1 μm to 0.7 μm, and the resolution of the Kerr effect method has improved from 1 μm to 0.5 μm. The resolution of the spin-polarized scanning electron microscopy (SP-SEM) has improved from 100–200 μm in 1984 to 20 nm in 1994. The magnetic force microscopy (MFM) had a resolution of 100 nm in 1987 and had a resolution of 10 nm in 1988. The electron holography had a resolution of 10 nm in 1991 and the Lorentz microscopy has a resolution of 10 nm now and will have a resolution of 0.7 nm in a near future.

As explained above, the resolution of surface magnetic evaluation has become higher and higher. However, a higher resolution is required on in either basic studies of material properties or engineering, for instance magnetic recording. Hence, it has been earnestly required to develop an evaluation method which can evaluate magnetic properties of a solid surface with an atomic resolution. The inventors of the present application have proposed a spin-polarized scanning tunneling microscopy (SP-STM).

FIG. 3 is a schematic view illustrating an experimental apparatus for proving the utility of SP-STM. In an actual SP-STM, a specimen is made of a magnetic material and a probe is made of gallium arsenide (GaAs). However, in the experimental apparatus, a specimen was made of GaAs and a probe was made of nickel (Ni). This does not cause any problem as long as the principle of the SP-STM is investigated. A single-mode laser diode 1 was used as a linearly polarized light source of about 830 nm in wavelength and about 30 mW in maximum output power. Linearly polarized laser beam was made incident upon a Pockels cell 3 by means of an lens 2. To the Pockels cell 3, was applied a high voltage from an oscillator 4 via a high voltage amplifier 5. Then, an excited circularly polarized laser beam was modulated into right-hand circularly polarization and left-hand circularly polarization at a modulation frequency of about 400 Hz. In this manner, the spin-polarization of excited electrons was changed. The modulated laser beam was made incident upon a specimen 11 as exciting light by means of reflection mirror 6-8, λ/4 plate 9 and lens 10. A probe 12 made of a crystal wire of Ni was biased by a DC voltage source 13 was brought into a close proximity of the surface of specimen 11 under the control of a Piezoelectric element 14 such that a tunneling current could flow from the specimen to the probe. The generated tunneling current was detected by a control unit 15, and an output signal of the control unit was supplied to a monitor 16 together with an output signal from the oscillator 4. In this manner, the tunneling current depending upon the spin-polarization of the surface of specimen 11 was detected.

In the above explained SP-STM, the tunneling current produced by the radiation excitation is detected, and thus could not be applied to electrically insulating magnetic materials. The inventors have proposed a possibility of an atomic force microscopy (AMF) which could detect the exchange force between a sample and a probe. Such an atomic force microscopy could be applied to insulating objects.

In the known atomic force microscopy, the measurement is performed within a non-contact region in which the tip of the probe is separated from the specimen surface by a relatively large distance or within a direct contact region in which the tip of probe is brought into contact with the specimen surface. In the measurement within the non-contact region, magnetic forces produced between magnetic dipoles are measured. However, these forces are of a long-range force, and thus it is impossible to realize an atomic resolution. In the measurement within the direct contact region, although it would be possible to evaluate the surface structure with an atomic resolution, it is impossible to measure the exchange force between the specimen and the probe in an accurate manner, because the probe tip is brought into contact with the specimen surface and is influenced by magnetic properties of the specimen surface. Therefore, it is impossible to evaluate inherent magnetism of the specimen surface in an accurate manner.

In order to overcome the above mentioned drawback, the inventors have proposed, in a co-pending patent application, a method of measuring an exchange force between a probe and an electrically conductive or electrically insulating specimen with an atomic resolution.

In this method, in order to measure an exchange force between a specimen and a probe each of which contains localized electrons and at least one of which contains conduction electrons, the specimen and probe are faced to each other by a distance within a close proximity region from a distance at which conduction electron clouds (wave function) begin to be overlapped with each other to a distance at which localized electron clouds (wave function) are not substantially overlapped with each other, and an exchange force between said two substances is measured. The above close proximity region is called RKKY type exchange interaction region.

FIG. 4 is a graph showing variations of force and energy between the specimen and the probe in accordance with a distance therebetween. It should be noted that the force may be derived by differentiating the energy. The RKKY type exchange interaction region is between the contact region in which a direct exchange interaction is taken place and the non-contact region in which an interaction between magnetic dipoles is carried out. In the known atomic force microscope, the direct exchange interaction region or non-contact region is used. In these regions, the force between the specimen and the probe could not be measured with an atomic resolution. It should be noted that in FIG. 4, boundaries between the direct exchange interaction region, RKKY-type exchange interaction region and magnetic dipole interaction region are denoted by broken lines, but in practice, these boundaries could not be determined clearly.

When a specimen and a probe are faced to each other by a distance within the RKKY-type exchange interaction region, an exchange force between the specimen and the probe is of an order of $10^{-10}$ N. Presently available atomic force microscope has a measuring limit of an order of about $10^{-12}$–$10^{-13}$ N. Therefore, the exchange force of an order of $10^{-10}$ N could be measured.

However, if an exchange force within the RKKY-type exchange interaction region is measured using a cantilever of the known atomic force microscope in which the non-contact region is utilized, the probe is brought into contact with the specimen, because a distance between the specimen and the probe could not be controlled precisely. Since a spring constant of the cantilever is very small, when the probe is brought into a close proximity of the specimen, a resilient force of the cantilever might be against a force between the specimen and the probe and the cantilever is attracted to the specimen. When a spring constant of the cantilever is increased, a sensitivity of the cantilever might be decreased largely and the exchange force of an order of $10^{-10}$ N between the specimen and the probe could not be measured precisely.

SUMMARY OF THE INVENTION

The present invention has for its object to provide a novel and useful apparatus for measuring precisely with an atomic resolution an exchange force between a specimen and a probe which are faced to each other by a very small distance within the RKKY-type exchange interaction region.

According to the invention, an apparatus for measuring an exchange force between a specimen and a probe each of which contains localized electrons and at least one of which contains conduction electrons, comprises:

a means for holding said specimen;

a resilient member for supporting said probe such that said specimen and probe are faced to each other by a distance within a close proximity region from a distance at which conduction electron clouds begin to be overlapped with each other to a distance at which localized electron clouds are not substantially overlapped with each other;

a displacement measuring means for measuring a displacement of said resilient member due to a force between the specimen and the probe;

a controlling means for controlling a resiliency of said resilient member against the force between the specimen and the probe such that the probe is prevented from being brought into contact with the specimen; and an exchange force detecting means for detecting an exchange force between the specimen and the probe in accordance with said displacement of the resilient member.

According to the invention, it is preferable that said resilient member is formed by a resilient cantilever having one end secured to a stationary member, and said displacement measuring means includes a first piezoelectric element secured to the cantilever, an oscillator for supplying a driving signal having a given frequency and a given amplitude to said first piezoelectric element, and an opto-electric position detecting device for detecting a displacement of the cantilever.

In a preferable embodiment of the apparatus according to the invention, said controlling means includes a spring constant adjusting means for adjusting a spring constant of the resilient member in accordance with the displacement of the resilient member supplied from the displacement measuring means.

Alternatively, the controlling means may be constructed by a means for preventing the probe from being brought into contact with the specimen by means of an electromagnetic force or an electrostatic force.

In a preferable embodiment of the apparatus according to the invention, said displacement measuring means includes a first piezoelectric element secured to the cantilever, an oscillator for generating a driving signal having a given frequency and a given amplitude, and an optical position detecting device for detecting a displacement of the cantilever in an opto-electric manner, said spring constant adjusting means comprises a second piezoelectric element and a control circuit for supplying a control signal to said second piezoelectric element such that the cantilever vibrates at the given frequency with a given amplitude, and said exchange force detecting means includes a calculation circuit for processing said control signal supplied from said control circuit to derive the exchange force between the specimen and the probe.

BRIEF DESCRIPTION OF THE DRAWINGS

FIG. 4 is a graph representing a distance dependency of a force between the specimen and the probe;

FIG. 5 is a schematic view showing, specimen and probe used in calculation for a measuring principle of the apparatus according to the invention;

FIG. 6 is a schematic view illustrating a model of atomic structure of the specimen and probe;

FIG. 7 is a graph representing a distance dependency of a force between the specimen and the probe;

FIG. 8 is a graph showing a distance dependency of magnetic moment of the specimen;

FIGS. 9A and 9B are schematic diagrams showing the condition of electrons within a direct exchange interaction region and an RKKY-type interaction region;

FIG. 10 is a schematic view illustrating an embodiment of the apparatus for measuring the exchange force by the method according to the invention;

FIG. 11 is a schematic view depicting a second embodiment of the exchange force measuring apparatus according to the invention; and FIG. 12 is a schematic view illustrating a third embodiment of the exchange force measuring apparatus according to the invention.

DESCRIPTION OF THE PREFERRED EMBODIMENT

Figure 1:
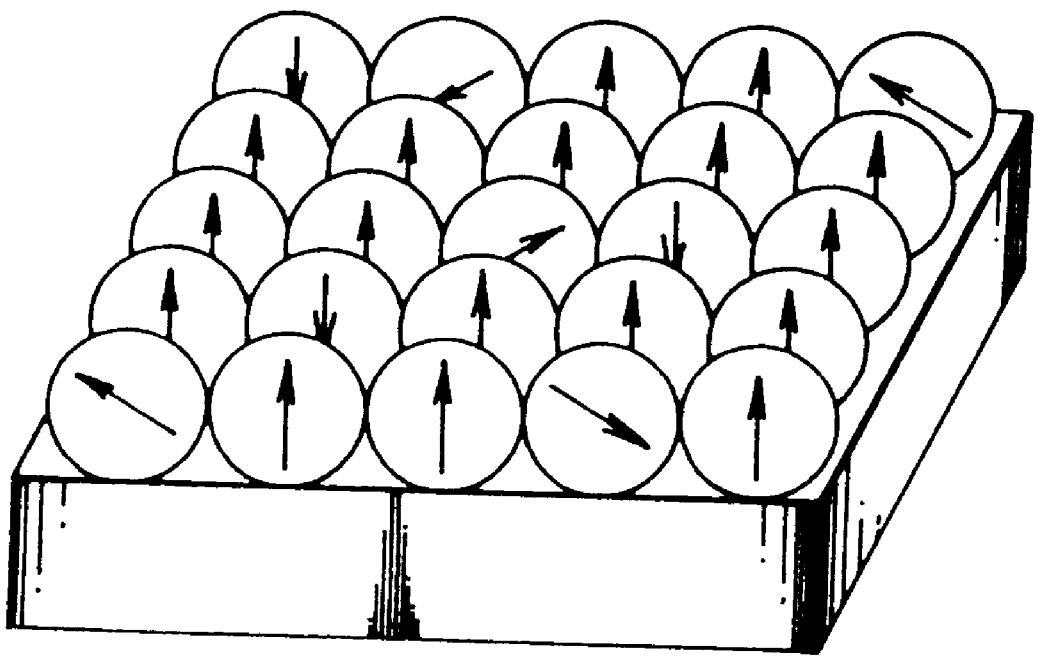
FIG. 1 is a schematic view showing the atomic structure of a magnetic specimen surface.
Figure 2:
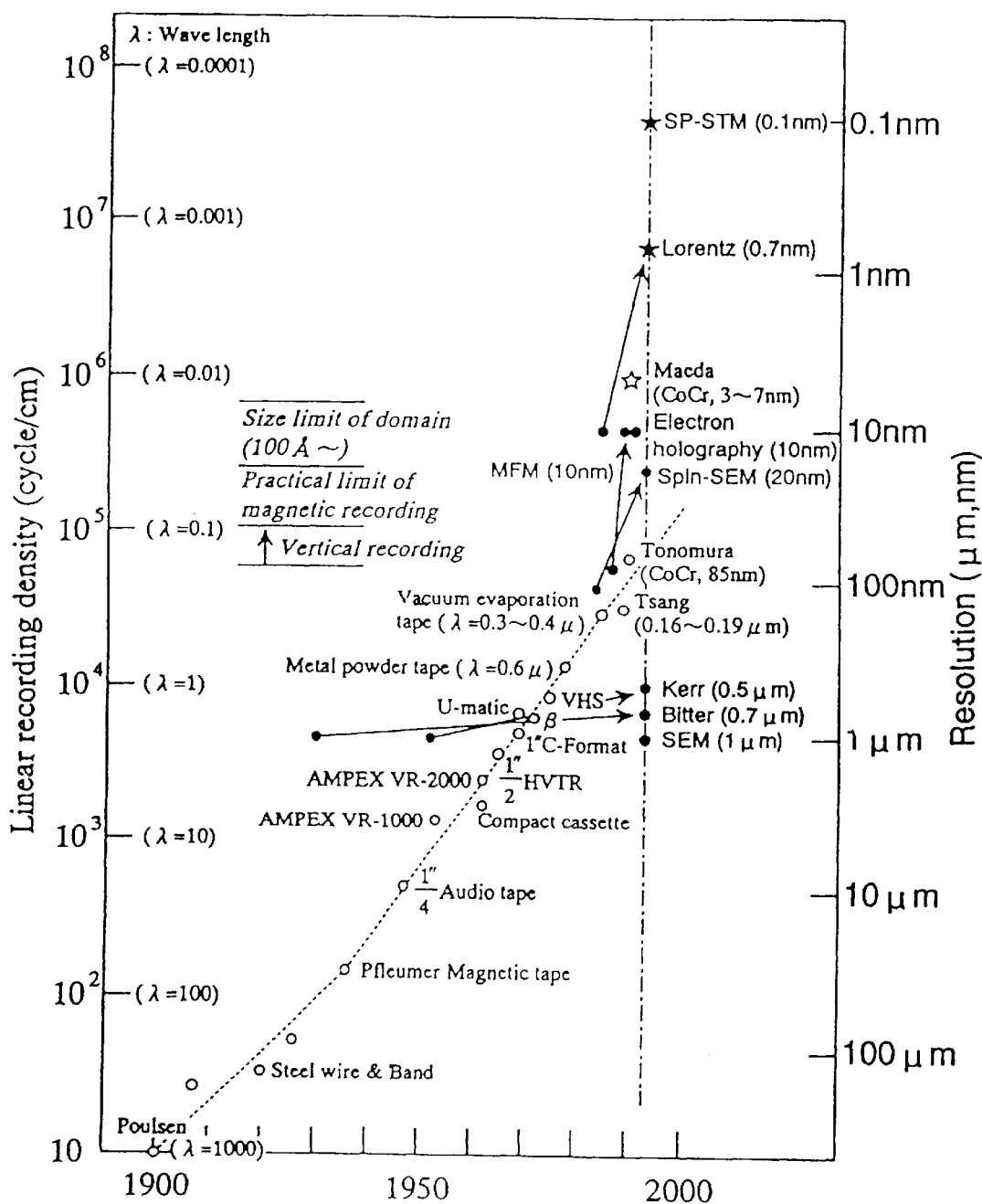
FIG. 2 is a diagram representing progress in magnetic medium, linear record density, evaluating method and the resolution.
Figure 3:
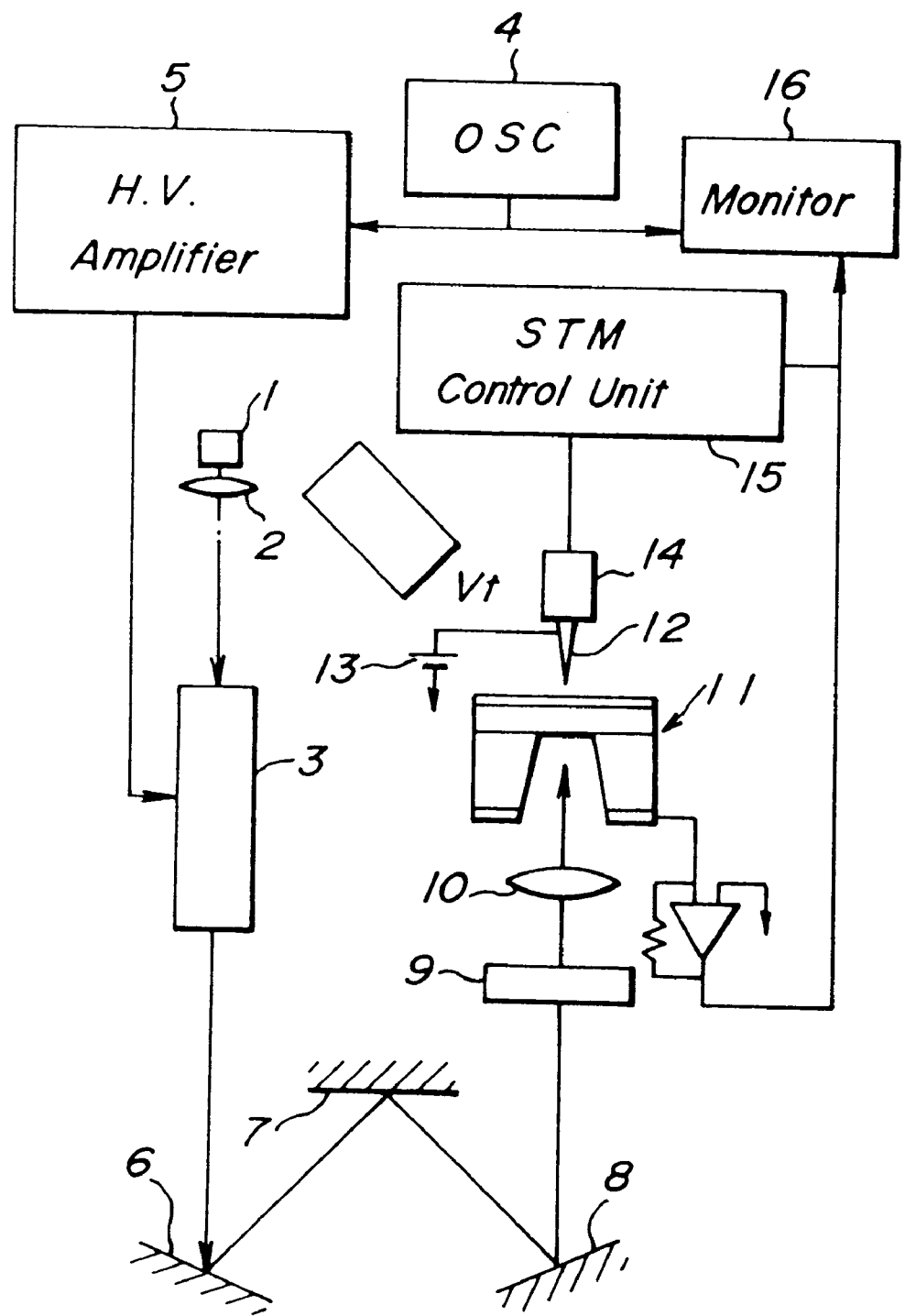
FIG. 3 is a schematic view illustrating a construction of a known spin-polarized scanning tunneling microscopy.

At first, we consider a simple model, in which two thin films made of iron which is a 3d transition metal are brought together in close proximity as shown in FIG. 5. One of the thin iron films may be a specimen and the other may be a probe. In actual measurement, the specimen may be considered as a thin film, but the probe is a very sharp tip and could not be considered as a thin film. However, in a microscopic view point, the probe may be also considered as a thin film. It is also assumed that each of the two thin films has a structure constructed by three atom layers as illustrated in FIG. 6, (001) surfaces of the thin films are faced to each other by a distance d, and a lattice constant of thin films is a (2.83 Å).

When an origin of coordinates is set at a middle point between the two films, a position of atoms of a first layer $x_1$ of the first thin film is expressed by $x_1(0, 0, d/2)$, a position of atoms of a second layer $x_2$ is expressed by $x_2(a/2, a/2, d/2+a/2)$, and a position of atoms of a third layer $x_3$ is expressed by $x_3(0, 0, d/2+a)$. Similarly, in the second thin film, a position of atoms of a first layer $x_1'$ is expressed by $x_1'(a/2, a/2, -d/2)$, a position of atoms of a second layer $x_2'$ is expressed by $x_2'(0, 0, -d/2-a/2)$, and a position of atoms of a third layer $x_3'$ is expressed by $x_3'(a/2, a/2, -d/2-a)$. The surface relaxation is not considered. So, lattices is assumed to be rigid.

Since the exchange force between the two thin films can be derived as a difference between a force obtained under a condition that directions of magnetic moments of these thin films are in parallel with each other and a second force obtained under a condition that directions of magnetic moments of the thin films are in anti-parallel with each other. Therefore, a dependency of these first and second forces upon a distance between the two thin films has been investigated. It has been derived by the first principle calculation using the local-spin approximation to the density-functional theory. Upon calculation, the full potential linear argumented plane wave (LAPW) method was employed. The inventors have reported in, for instance Japanese Journal of Applied Physics, Vol. 33 (1994), pp. 2692–2695, Materials Science and Engineering B31 (1995), pp. 69–76, and Physical Review B56(1995), pp. 3218–3321, calculation results of forces applied to respective atoms under such a condition that directions of magnetic moments are parallel with each other. In order to measure an actual exchange force, it is necessary to derive a difference between a force measured under such a condition that directions of magnetic moments are in parallel with each other and a force measured under such a condition that directions of magnetic moments are in anti-parallel with each other.

According to the invention, not only force applied to the respective thin films under the parallel condition of magnetic moments, but also force applied to the respective thin films under the condition of the anti-parallel condition of magnetic moments are calculated in an extremely precise manner, and calculation results shown in FIG. 7 could be obtained. In FIG. 7, the horizontal axis denotes a distance d normalized by the lattice constant a (d/a) and the vertical axis shows a force F ($10^{-9}$ N). A curve $F_P$ represents the force in the parallel condition and a curve $F_{AP}$ shows the force in the anti-parallel condition.

The force between the thin films contain forces other than the exchange force, and therefore in order to derive only the exchange force, it is necessary to cancel out the forces other than the exchange force by deriving a difference between them. In FIG. 7, the calculated exchange force is shown by a curve $F_{ex}=F_{AP}-F_P$. As can be seen from the curve $F_{ex}$, the exchange force has a large dependency upon the distance d between the two thin films. Within a region of d/a≦1.7, the exchange force appears. Particularly, within a region of d/a <1.0, a large exchange force is recognized. Within a region of 1.0≦d/a≦1.7, the existence of the exchange force is recognized. However, in a region of d/a>2.0, no exchange force could appear.

Then, a dependency of the magnetic moment of the thin film under the parallel and the anti-parallel conditions has been investigated and a result shown in FIG. 8 was obtained. In FIG. 8, the horizontal axis denotes a distance a between the thin films normalized by the lattice constant a (d/a), and the vertical axis represents the magnetic moments m($\mu$B). Curves $X_1(P)$ and $x_1(AP)$, $x_2$ and $x_3$ show magnetic moments of atoms in the layers $x_1$, $x_2$ and $x_3$, respectively. The curve $X_1(P)$ shows a change in the magnetic moment under the parallel condition and the curve $x_1(AP)$ represents a change in the magnetic moment under the anti-parallel condition. The magnetic moments of atoms in the second layer $x_2$ are substantially identical with that of the bulk. When the normalized distance d/a between the two thin films is smaller than 1.0, the magnetic moment of the first layer $x_1$ is greatly deceased. This means that atoms in this first layer $x_1$ are subjected to the direct exchange interaction. Within the region in which the normalized distance d/a is smaller than 1.0, spins in the first thin film are directly exchange interacted. Therefore, in the present invention, this region is called a direct exchange interaction region. As explained above with reference to FIG. 7, in the direct exchange interaction region of the normalized distance d/a smaller than 1.0, it is possible to attain a large exchange force. However, within this direct exchange interaction region, the magnetic moment changes largely, and therefore the magnetic structure of a specimen surface might be affected by the probe and the magnetic property of the specimen surface could not be evaluated accurately.

According to the invention, it is extremely preferable to measure the exchange force within the region of 1.0≦d/a≦1.7. In the direct exchange interaction region of d/a<1.0, the localized electron clouds (wave functions) of, for instance 3d orbitals are overlapped with each other as shown in FIG. 9A, and in the region of 1.0≦d/a≦1.7, although the localized electron clouds are separated from each other as depicted in FIG. 9B, the conduction electron clouds (wave functions) of 4s and 3p orbitals are overlapped with each other. Therefore, according to the invention, the exchange force is measured by separating a specimen surface and a probe from each other by a distance within a region from a distance at which the conduction electron clouds of 4s and 3p orbitals begin to be overlapped with each other to a distance at which the localized electron clouds of 3d orbital are not substantially overlapped with each other. In the present specification, such a region is called a RKKY-type exchange interaction region. The measurement of the exchange force according to the invention is applied not only to the above mentioned 3d transition metal, but also to molecules revealing magnetism, 4f rare earth metals and compounds and magnetic semiconductors. It should be noted that the present invention may be equally applied to two substances each of which includes localized spins and at least one of which contains conduction electrons.

As explained above with reference to FIG. 7, the magnitude of the exchange force $F_{ex}$ measured in the RKKY-type exchange interaction region, i.e. 1.0≦d/a≦1.7 is smaller than that measured in the direct exchange interaction region, but is still of order of $10^{-10}$ N. The exchange force having such a magnitude can be measured, because the conventional atomic force microscope has a resolution of about $10^{-12}$ to $10^{-13}$ N. Furthermore, this RKKY-type exchange force changes in a sinusoidal manner, and thus the exchange force can be measured accurately using such a characteristic.

Now several embodiments of the apparatus for measuring the exchange force between a specimen and a probe according to the invention will be explained.

FIG. 10 is a schematic view showing a first embodiment of the apparatus for measuring the above mentioned RKKY-type exchange force according to the invention. A specimen 21 whose magnetic properties are to be evaluated is placed on a stage 22 which can be moved in a three-dimensional manner. Above the specimen stage 22 is arranged a resilient cantilever 23 whose one end is secured to a stationary member by means of a first piezoelectric element 25. The resilient cantilever 23 is formed by a resilient strip made of silicon, silicon nitride, stainless steel, phosphor bronze and so on. A probe 24 is secured on a lower surface of the resilient cantilever 23 near its distal end. It is preferable that the probe 24 has a sharp tip. According to the invention, there is no special limitation for a combination of materials of the specimen 21 and probe 24, the probe may be made of any suitable material from a view of workability, except for a condition due to a property of a magnetic specimen. Therefore, according to the invention, the cantilever 23 and probe 24 may be formed as a single integral body.

As explained above, the cantilever 23 is secured to the stationary member by means of the first piezoelectric element 25, which is connected to an oscillator 26 which generates a driving signal having a frequency of several hundreds KHz to vibrate the cantilever 23 at such a frequency. On the upper surface of the cantilever 23 is provided a reflection member 27, and a laser light beam emitted by a laser light source 28 is made incident upon the reflection member from an inclined direction. The laser beam reflected by the reflection member 27 is received by a position sensor 29. The position sensor 29 comprises an array of a plurality of light receiving elements and a position upon which the laser beam is made incident can be detected. In this manner, a position of the probe 24 in a direction Z perpendicular to the surface of the specimen 21 can be detected in a very precise manner.

The specimen stage 22, cantilever 23, laser light source 28 and position sensor 29 are all installed within a vacuum chamber 30 to which a vacuum pump (not shown) is connected. In this manner, a space within the chamber 30 can be maintained at ultra-high vacuum condition, and thus the accurate measurement of the exchange force can be achieved without being influenced by dusts deposited on the specimen 21. If the apparatus is placed in an extremely clean space, it is not necessary to use the vacuum chamber.

In order to prevent the probe 24 from being brought into contact with the specimen 21 against a resilient force of the cantilever 23 by means of a force between the specimen 21 and the probe 24, in the present embodiment, there is provided a spring constant controlling means. That is to say, a second piezoelectric element 31 is provided on the cantilever 23. This second piezoelectric element 31 is connected to a control circuit 32.

Outside the vacuum chamber 30, there are arranged, in addition to the above mentioned oscillator 26 and control circuit 32, a driving circuit 33 for driving the specimen stage 22, a displacement measuring circuit 34 connected to said position sensor 29, a calculating circuit 35 for calculating output signals supplied from the control circuit 32 to derive an exchange force applied to the probe 24, and a processing circuit 36 for processing an output signal supplied from the calculating circuit 35 to evaluate magnetic properties of the specimen 21 on the basis of the measured exchange force applied to the probe 24.

After placing the specimen 21 on the stage 22 and exhausting the vacuum chamber 30, the specimen stage 22 is driven by the driving circuit 33 such that the tip of probe 24 is faced to a given portion of the specimen. In this case, a distance between the specimen 21 and the tip of probe 24 is set to a value within the above mentioned RKKY-type exchange interaction region. Then, the piezoelectric element 25 is driven by the oscillator 26 such that the resilient lever 23 and thus the probe 24 are vibrated in the direction Z at a given frequency. The frequency is preferably set to a resonant frequency of the cantilever 23. Due to this vibration, the position of the laser beam impinging upon the position sensor 29 is changed in a periodic manner. When the probe 24 is placed remote from the specimen 21 and any force is not induced between the specimen 21 and the probe 24, the vibration of the resilient lever 23 is not affected at all and the lever is vibrated at given frequency and amplitude. However, when the probe 24 is brought closer to the specimen 21 by a distance within said RKKY-type exchange interaction region, a force is induced between the specimen 21 and the probe 24 and the vibration of the lever 23 is influenced by this force. Then, the frequency and amplitude of the vibration of the resilient cantilever 23 are changed. In the present embodiment, a displacement signal generated by the displacement measuring circuit 34 is supplied to the control circuit 32. The control circuit 32 produces a control signal and the thus produced control signal is supplied to the second piezoelectric element 31. The control signal is formed such that the cantilever 23 vibrates at said given frequency and amplitude irrespective of the exchange force between the specimen 21 and the probe 24. In other words, in the present embodiment, to the second piezoelectric element 31 is supplied such a control signal that a spring constant of the resilient cantilever 23 is increased in accordance with a decrease in a distance between the specimen 21 and the probe 24.

As explained above, the cantilever 23 is controlled by the second piezoelectric element 31 such that the cantilever 23 vibrates at said given frequency and amplitude, and thus the control signal supplied from the control circuit to the second piezoelectric element 31 represents the force induced between the specimen 21 and the probe 24. Therefore, the control signal is also supplied to the calculating circuit 35 to derive the force between the specimen 21 and the probe 24. The thus calculated force is once stored in the calculating circuit 35. As stated above, forces between the specimen 21 and the probe 24 are measured under such conditions that directions of magnetic moments are in parallel with each other and directions of magnetic moments are in anti-parallel with each other, and the exchange force is measured as a difference between both two forces. These parallel mode and anti-parallel mode may be attained by providing an electromagnetic coil around the probe 24 and flowing a current into a first direction to magnetize the probe in a first direction. After measuring one of the first and second forces, a current is flowed through the coil in a second direction opposite to said first direction to magnetize the probe in a second direction opposite to the first direction, and the other of said first and second forces is measured. During the measurement of the forces, no current flows through the coil, and therefore the measurement of force is not affected at all.

Then, a difference between the first and second forces calculated and stored in the calculating circuit 35 is calculated to derive the exchange force between the specimen 21 and the probe 24. Finally, the calculated exchange force is supplied to the processing circuit 36 and magnetic properties of the specimen 21 are evaluated on the basis of the exchange force.

FIG. 11 is a schematic view showing a major portion of a second embodiment of the exchange force measuring apparatus according to the invention. In the first embodiment explained above, the spring constant of the resilient cantilever 23 is controlled by the second piezoelectric element 31 provided on the cantilever in such a manner that the probe 24 is prevented from being brought into contact with the specimen 21 by the force between the specimen and the probe. In the present embodiment, the attraction of the cantilever is prevented by means of a magnetic force. To this end, a resilient cantilever 42 is vibrated by means of a piezoelectric element 41 and a magnetic member 43 is secured to a distal end of the cantilever 42. Above the magnetic member 43 is arranged a magnetic coil 44 which is connected to a control circuit 46. The control circuit 46 is connected to a displacement measuring circuit 45.

In the present embodiment, by controlling a current supplied to the magnetic coil 44 by the control circuit 46 in accordance with a displacement signal supplied from the displacement measuring circuit 45 to produce a magnetic force applied to the magnetic member 43 such that the magnetic member is moved upward and a probe 48 secured to the cantilever 42 is not attracted to a specimen 47 by a force between the specimen and the probe.

In this manner, by controlling the current supplied to the magnetic coil 44 such that the cantilever 42 vibrates at the given frequency and amplitude. Then, a control signal produced by the control circuit 46 represents the exchange force between the specimen 47 and the probe 48. In the present embodiment, the magnetic coil 44 is arranged above the cantilever 42, but it may be provided under the cantilever.

FIG. 12 is a schematic view showing a major portion of a third embodiment of the exchange force measuring apparatus according to the invention. In the present embodiment, a resilient cantilever 52 is vibrated at given frequency and amplitude by a piezoelectric element 51 and an electrode 53 is arranged above the cantilever. A variable DC voltage source 54 is connected across the cantilever 52 and the electrode 53. A probe 56 is secured to a distal end of the cantilever 56 to be faced with a specimen 55. By adjusting a DC voltage applied by the variable DC voltage source 54 across the cantilever 52 and the electrode 53 in accordance with a control signal which is produced on the basis of the displacement of the cantilever 52. Then, the cantilever 52 is subjected to an electrostatic force produced between the cantilever 52 and the electrode 53 and the probe 56 is prevented from being attracted to the specimen 55. By adjusting the control signal such that the cantilever 52 is vibrated at the given frequency and amplitude irrespective to the force between the specimen 55 and the probe 56, it is possible to measure the exchange force between the specimen and the probe by processing the control signal.

The present invention is not limited to the embodiments explained above, but many alternations and modifications may be conceived by a person skilled in the art within the scope of the invention. In the above embodiments, the mechanical force, magnetic force and electrostatic force are used to prevent the probe provided on the cantilever from being attracted to the specimen. However, according to the invention, any other means may be utilized to avoid the attraction of the probe to the specimen by the exchange force between the specimen and the probe.

As explained above, in the apparatus for measuring the exchange force according to the invention, the controlling means is provided for controlling the resiliency of the resilient cantilever against the force between the specimen and the probe such that the probe is prevented from being attracted to the specimen, and therefore the exchange force between the specimen and the probe can be measured accurately with an atomic resolution in regardless of compositions of the specimen and probe and the magnetic property of the specimen can be evaluated accurately on the basis of the measured exchange force.

What is claimed is:

1. An apparatus for measuring an exchange force between a specimen and a probe each of which contains localized electrons and at least one of which contains conduction electrons, comprising:

a means for holding said specimen;

a resilient member for supporting said probe such that said specimen and probe are faced to each other by a distance within a close proximity region from a distance at which conduction electron clouds begin to be overlapped with each other to a distance at which localized electron clouds are not substantially overlapped with each other;

a displacement measuring means for measuring a displacement of said resilient member due to a force between the specimen and the probe;

a controlling means for controlling a resiliency of said resilient member against the force between the specimen and the probe such that the probe is prevented from being brought into contact with the specimen; and an exchange force detecting means for detecting an exchange force between the specimen and the probe in accordance with said displacement of the resilient member.

2. An apparatus according to claim 1, wherein said controlling means includes a spring constant adjusting means for adjusting a spring constant of the resilient member in accordance with the displacement of the resilient member supplied from the displacement measuring means.

3. An apparatus according to claim 2, wherein said resilient member is formed by a resilient cantilever having one end secured to a stationary member, and said displacement measuring means includes a first piezoelectric element secured to the cantilever, an oscillator for supplying a driving signal having a given frequency and a given amplitude to said first piezoelectric element, and an opto-electric position detecting device for detecting a displacement of the cantilever.

4. An apparatus according to claim 3, wherein said spring constant adjusting means comprises a second piezoelectric element and a control circuit for supplying a control signal to said second piezoelectric element in accordance with the displacement of the cantilever such that the cantilever vibrates at the given frequency and amplitude, and said exchange force detecting means includes a calculation circuit for processing said control signal supplied from said control circuit to derive the exchange force between the specimen and the probe.

5. An apparatus according to claim 4, wherein said controlling means includes an electromagnetic controlling means for applying a force to the probe in accordance with the displacement of the cantilever such that the probe is moved away from the specimen.

6. An apparatus according to claim 5, wherein said electromagnetic controlling means comprises a magnetic member provided on the cantilever and a magnetic coil arranged to be opposed to said magnetic member.

7. An apparatus according to claim 4, wherein said controlling means includes an electrostatic controlling means for preventing the probe from being brought into contact with the specimen by means of an electrostatic force.

8. An apparatus according to claim 7, wherein said electrostatic controlling means comprises an electrode arranged to be opposed to said cantilever and a variable DC voltage source connected across said cantilever and the electrode for supplying a DC voltage in accordance with the displacement of the cantilever.

9. A method according to claim 1, wherein said specimen and probe are made of transition metal having a lattice constant a, and the probe is faced to the specimen surface by a distance d while a condition $1.0 \leq d/a \leq 1.7$ is satisfied.

* * * * *